(12) United States Patent
Wakefield et al.

(10) Patent No.: US 9,234,603 B1
(45) Date of Patent: Jan. 12, 2016

(54) AIR DAMPER

(75) Inventors: Stephen E. Wakefield, Broken Arrow, OK (US); Mark W. Fly, Broken Arrow, OK (US)

(73) Assignee: AAON, Inc., Tulsa, OK (US)

( * ) Notice: Subject to any disclaimer, the term of this patent is extended or adjusted under 35 U.S.C. 154(b) by 537 days.

(21) Appl. No.: 13/483,121

(22) Filed: May 30, 2012

Related U.S. Application Data

(60) Provisional application No. 61/529,283, filed on Aug. 31, 2011.

(51) Int. Cl.
*F16K 1/16* (2006.01)
*F16K 27/00* (2006.01)

(52) U.S. Cl.
CPC ...................... *F16K 27/00* (2013.01)

(58) Field of Classification Search
CPC ........ F24F 13/1406; F24F 13/15; F16K 27/00
USPC ............. 137/601.05, 601.08, 601.09, 601.06, 137/601.11; 454/325, 333, 334, 335, 336
See application file for complete search history.

(56) References Cited

U.S. PATENT DOCUMENTS

| | | | | |
|---|---|---|---|---|
| 3,084,715 A | * | 4/1963 | Scharres | 137/601.06 |
| 3,783,768 A | * | 1/1974 | Caming et al. | 454/335 |
| 3,832,940 A | | 9/1974 | Hess | |
| 3,885,347 A | | 5/1975 | Adachi et al. | |
| 4,192,098 A | * | 3/1980 | Brzezinski | 49/91.1 |
| 4,256,143 A | | 3/1981 | Magill et al. | |
| 4,275,762 A | | 6/1981 | Field | |
| 4,294,283 A | | 10/1981 | Scharres | |
| 4,541,328 A | * | 9/1985 | Brzezinski et al. | 454/336 |
| 5,730,652 A | * | 3/1998 | Van Becelaere | 454/335 |
| 5,918,632 A | | 7/1999 | Bachmann et al. | |
| 5,944,506 A | | 8/1999 | Kamal et al. | |
| 6,098,339 A | * | 8/2000 | Rivera et al. | 49/74.1 |

* cited by examiner

*Primary Examiner* — John K Fristoe, Jr.
*Assistant Examiner* — Reinaldo Sanchez-Medina
(74) *Attorney, Agent, or Firm* — Molly D. McKay

(57) ABSTRACT

A low cost air damper that provides a good seal with low torque requirements. Blade seals of square cross sectional configuration are provided on each damper blade so that the blade seals engage adjacent blades before the blades are fully closed. L-shaped side seals and multiple discs that receive the ends of the blades serve collectively to seal between sides of the damper frame and the blades when the blades are closed even when the blades are not cut precisely. One edge of the L-shaped side seals engages and seals against the discs and the other edge of the side seals laps over and seals against a flat side of the blades and against the square blade seals. A low friction coating is applied to the side seals to further reduce friction.

12 Claims, 6 Drawing Sheets

AIR DAMPER

CROSS-REFERENCE TO RELATED APPLICATIONS

The present application claims priority to Provisional Patent Application Ser. No. 61/529,283 for Air Damper that was filed on Aug. 31, 2011.

BACKGROUND OF THE INVENTION

1. Field of the Invention

The present invention is an air damper that is low cost, has a low torque requirement, and makes a good seal when the blades of the air damper are closed.

2. Description of the Related Art

Air dampers with multiple blades that rotate to modulate air flow have one common problem. That problem is that they are difficult to make seal properly. This problem has several contributing factors.

First, there is air leakage between adjacent blades when the blades do not fully and tightly close. To address this problem, closer tolerances can be introduced between adjacent blades or seals can be provided on the blades. Closer tolerances and seals between blades create higher manufacturing costs and create higher friction between adjacent blades which requires more torque being applied to the blades in order to fully close them.

Various types of seals have been used on adjacent blade edges to try to seal between the blades, but these seals still require that the blades to be fully closed in order to properly seal. There is often some "play" in the closure mechanism so that the blades often do not fully close, but instead are still partially open when they are suppose to be in their closed position. Even with seals on the blade edges, if the seals do not engage the adjacent blades prior to the blades being fully closed, they will not seal between the blades.

Also, there is air leakage between the ends of the blades and the supporting damper frame. This leakage is due to the fact that existing side seal designs are have high leakage rates and because the lengths of the blades may not be cut precisely square, may not be cut at uniform lengths and may not be cut so that there are close tolerances between the ends of the blades and the frame.

The present invention addresses all of these problems. The present invention is provided with a blade seal that is square in cross sectional configuration. The blade seal is provided on the blade edges so that the blade seal engages the adjacent blade early, before the blades are fully closed, i.e. in their parallel, aligned orientation. The reason the blade seal engages the adjacent blade early is that the diameter of the diagonal of the square seal is longer than the length of the side of the square seal.

Thus, the square configuration blade seals make it unnecessary to remove the "play" from the closure mechanism in order to fully seal between adjacent blades and makes it unnecessary to have precise parallel alignment of the blades in order for the seals to engage.

The blade seal attachment to the damper blade is preferably constructed of a plastic such as polypropylene, nylon or ABS plastic to which sponge rubber is bonded. The plastic used is preferably polypropylene. Polypropylene is rigid, low friction, and dimensionally stable so that it maintains its length once it is cut to the desired length. The sponge rubber is flexible and capable of sealing against the adjacent blades.

Also, the present invention is provided with a side seal mechanism that seals and stops air leakage between the ends of the blades and the damper frame even when the blades are not completely closed, cut precisely square, when the blades are not cut at uniform lengths and when the blades are not cut so there are close tolerances between the ends of the blades and the frame.

The present invention provides an air damper with three advantages: it is low cost to make and operate, it has low torque requirements, and it provides a good seal. Previous air dampers may have been able to provide one or two of these advantages, but none have previously been able to provide all three of these advantages in the same unit.

SUMMARY OF THE INVENTION

The present invention provides an air damper with three advantages: it is low cost to make and operate, it has low torque requirements, and it provides a good seal.

The invention is provided with a blade seal that is square in cross sectional configuration. The blade seal is provided on one of the blade edges of the blades so that the blade seal engages the adjacent blade early, before the blades are fully closed, i.e. before they reach their parallel, aligned orientation. This insures a good seal between adjacent blades without the need for tight blade closing tolerances and even when there is some looseness or "play" in the closure mechanism that prevents the blades from fully closing.

The blade seal is comprised of a base that secures to the blade edge and of a square configured portion that engages an adjacent blade when the blade approach each other as they close. The base of the blade seal is preferably constructed of a plastic such as polypropylene, nylon or ABS plastic to which sponge rubber is bonded for the square configured portion. The plastic used is preferably polypropylene which is rigid, has low friction, and is dimensionally stable so that it maintains its length once it is cut to the desired length. The sponge rubber from which the square configured portion of the blade seal is formed is flexible and capable of sealing against the adjacent blades.

The present invention is also provided with a side seal mechanism that seals against the blades adjacent to the ends of the blades and stops air leakage between the ends of the blades and the damper frame when the blades are closed. The side seal mechanism prevents air leakage at the ends of the blades even when the blades are not completely closed, are not cut precisely square, when the blades are not cut at uniform lengths and when the blades are not cut so there are close tolerances between the ends of the blades and the frame.

To allow the side seal to make good contact with the blades when they are closed, one side of each blade is made into a flat configuration rather than curved side configurations which are traditionally found on both sides of air damper blades. Also, the square blade seals located between the edges of adjacent blades provide an additional flat surface which the side seals are able to engage and against which they seal when the blades are closed.

The ends of the blades are received in and sealed within grooves provided in front sides of rotatable discs that are provided on either end of each blade. These rotatable discs provide a straighter sealing surface for poorly cut blade ends. The rotatable discs are constructed of a low friction material. As the blades rotate open, the discs rotate in conjunction with the blades and provide a low friction surface to compress and slide over the side seals.

One edge of the L-shaped side seals engages and seals to the back side of the discs and the other edge of the L-shaped side seals lap over and extends beyond the blade edges and makes a good seal with the flat sides of the blades when the blades are closed. Because of this arrangement of the discs, blades and side seals; the side seals make a good seal with the blades even when the ends of the blades are not cut square, not cut to the same lengths, and not cut so there is a tight tolerance between the blade ends and the frame of the damper.

A low friction coating is applied to the side seals to further reduce friction and the torque required to open and close the damper blades.

DETAILED DESCRIPTION OF THE PREFERRED EMBODIMENT

Figure 1:
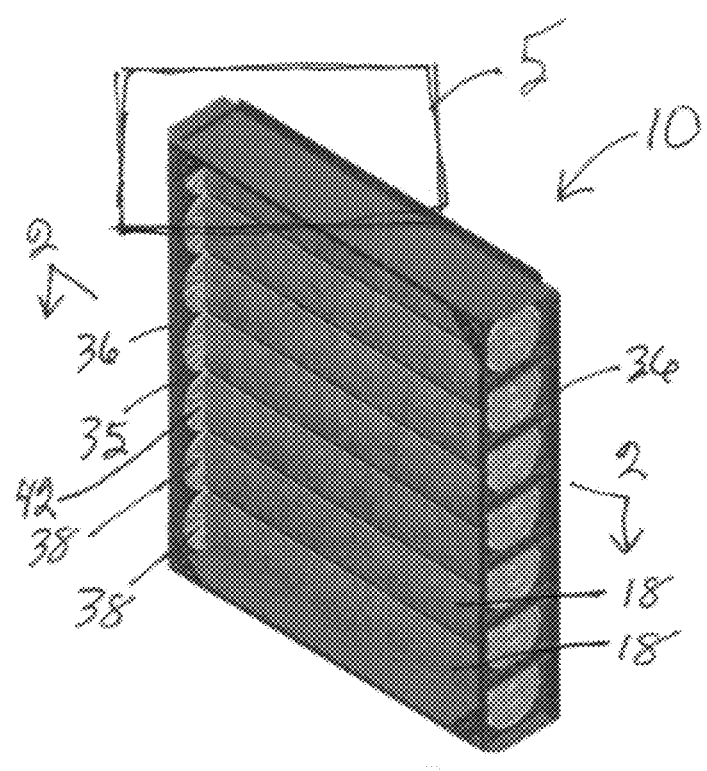
FIG. 1 is a perspective view of an air damper constructed in accordance with a preferred embodiment of the present invention.
Figure 2:
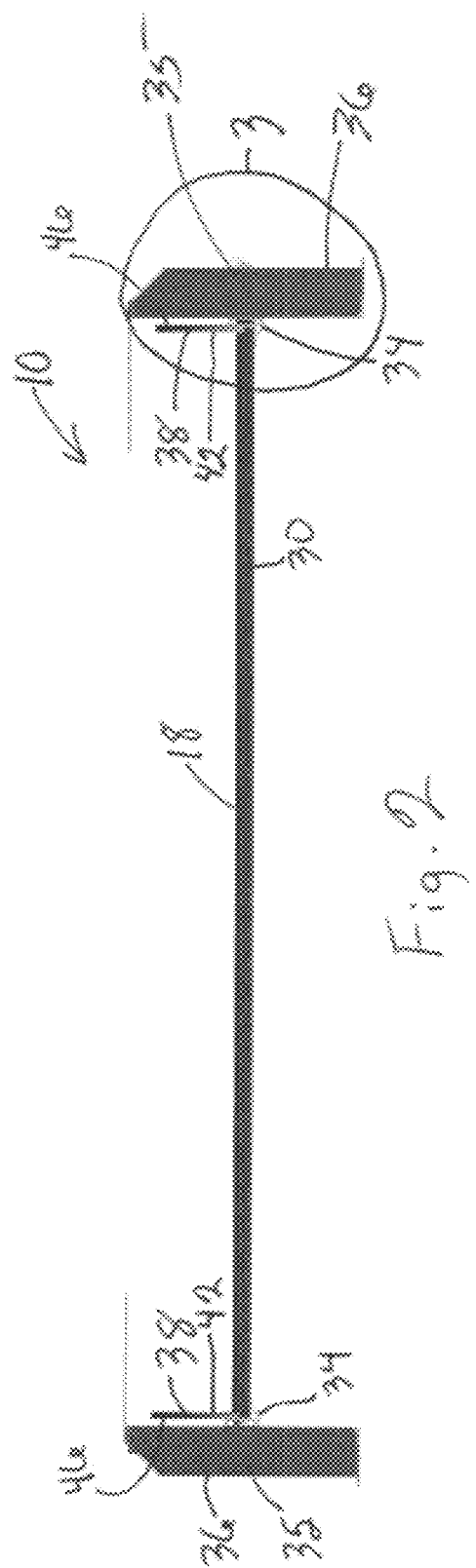
FIG. 2 is cross sectional view taken along line 2-2 of FIG. 1.
Figure 3:
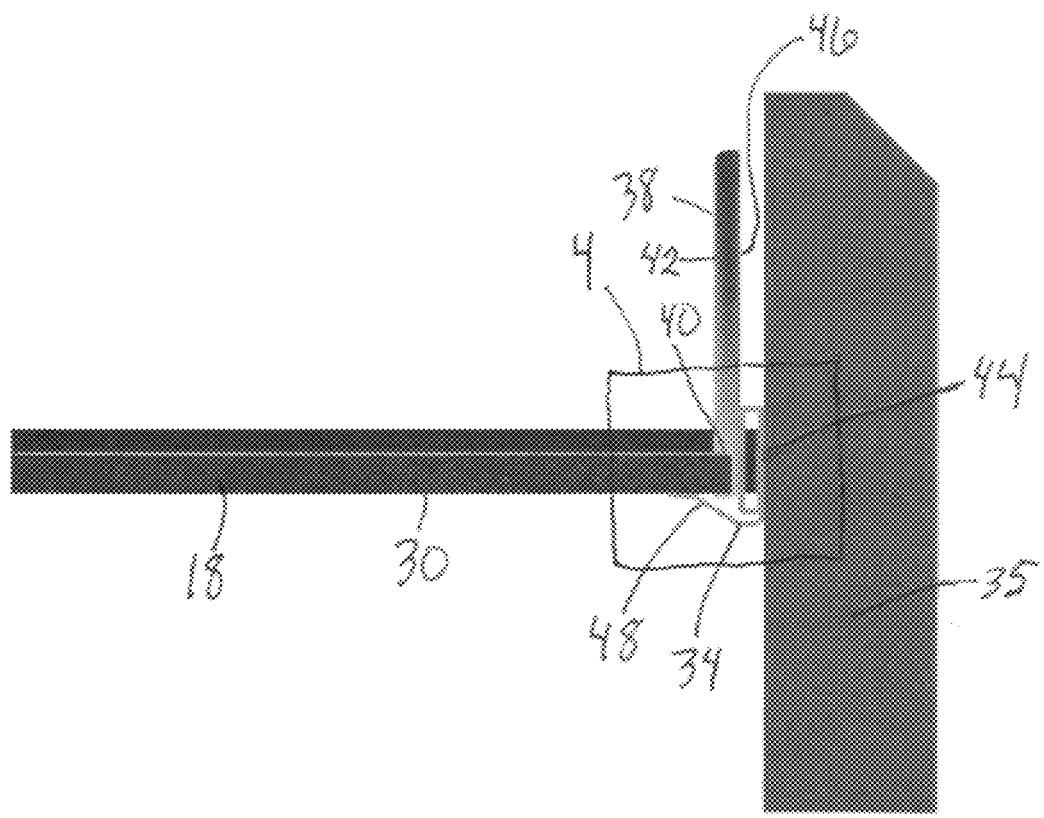
FIG. 3 is an enlarged view of the area within circle 3 of FIG. 2.

Referring now to the drawings and initially to FIG. 1, there is illustrated an air damper 10 that is constructed in accordance with a preferred embodiment of the present invention. The damper 10 is low cost to make and operate, has low torque requirements, and provides a good air seal.

Figures 6, 7:
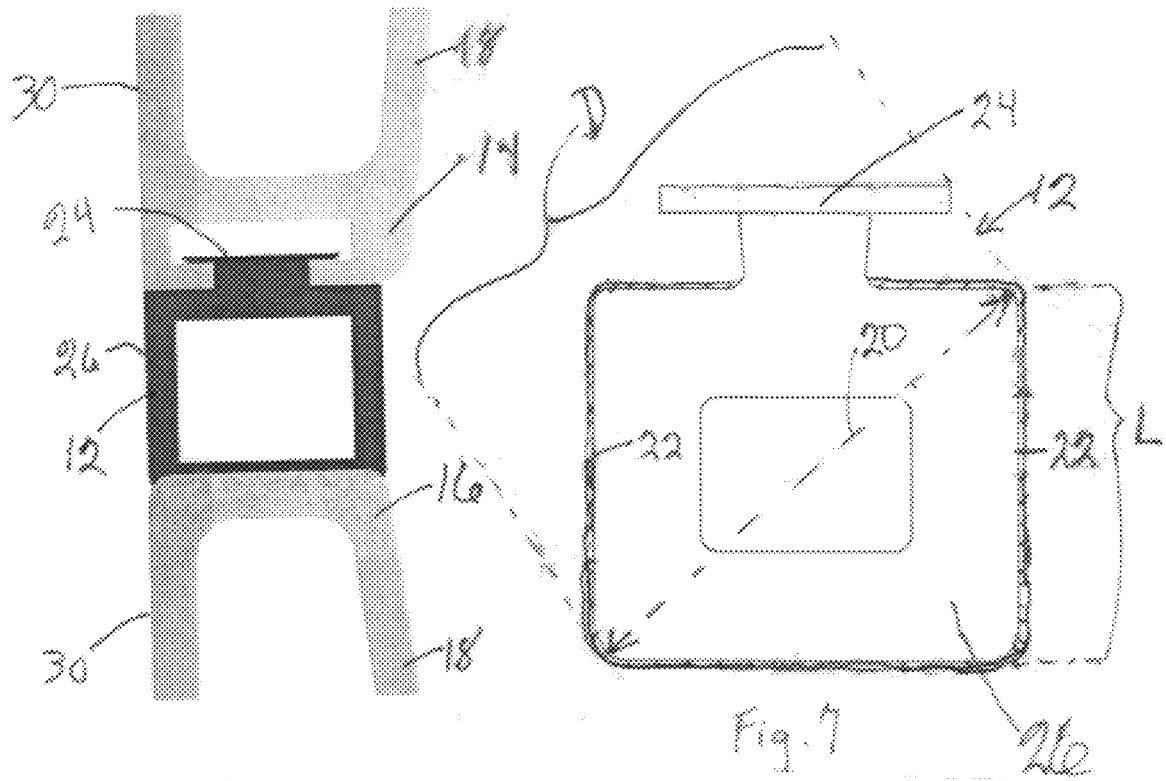
FIG. 6 is a cross sectional view taken along line 6-6 of FIG. 4
FIG. 7 is an enlarged view of the blade seal of FIG. 6 shown removed from the blade.

Referring now to FIGS. 6 and 7, the damper 10 is provided with a blade seal 12 that is square in cross sectional configuration. The blade seal 12 is provided on one of the blade edges 14 of the damper blades 18 so that the blade seal 12 engages the opposing edge 16 of an adjacent blade 18 early, i.e. before the blades 18 are fully closed in their parallel, vertically aligned orientation. The reason the blade seal 12 engages the blade edges 16 of the adjacent blade 18 early is that a diameter "D" of the diagonal 20 of the square blade seal 12 is greater in length than the length "L" of the side 22 of the square blade seal 12. This insures a good seal between adjacent blades 18 without the need for tight blade closing tolerances and even when there is some looseness or "play" in the mechanical closure mechanism that prevents the blades 18 from fully closing.

Thus, the square configuration blade seals 12 make it unnecessary to remove the "play" from the closure mechanism in order to fully seal between adjacent blades 18 and makes it unnecessary to have precise parallel alignment of the blades 18 in order for the blade seals 12 to engage.

Continuing to refer to FIG. 7, the blade seal 12 is comprised of a base 24 that secures to the blade edge 14 and of a square configured portion 26 that engages an opposing edge 16 of an adjacent blade 18 when the blades 18 approach each other as they close. The base 24 of the blade seal 12 is preferably constructed of a plastic such as polypropylene, nylon or ABS plastic. The square configured portion 26 is preferably constructed of sponge rubber or other similarly flexible and resilient material.

The square configured portion 26 and the base 24 are bonded together to form the blade seal 12. The plastic used is preferably polypropylene. Polypropylene is desirable because it is rigid, has low friction, and is dimensionally stable so that it maintains its length once it is cut to the desired length. The sponge rubber from which the square configured portion 26 of the blade seal 12 is formed is flexible and capable of sealing against the opposing blade edges 16 of the adjacent blades 18.

Referring now to FIGS. 2, 3, 4, 5 and 8, the damper 10 is also provided with a side seal mechanism that seals against a flat side 30 of the blades 18 adjacent to the ends 32 of the blades 18 and stops air leakage between the ends 32 of the blades 18 and a damper frame 35 which surrounds and supports the blades 18. The side seal mechanism is comprised of an L-shaped side seal 34 located on each side 36 of the damper 10 and a disc 38 associated with each end 32 of each blade 18. The side seal mechanism cooperates with and seals between the frame 35 and the ends 32 of the blades 18 when the blades 18 are closed to prevent air leakage between the damper frame 35 and the blades 18 of the damper 10. The side seal mechanism prevents air leakage at the ends 32 of the blades 18 even when the blades 18 are not cut precisely square, when the blades 18 are not cut at uniform lengths and when the blades 18 are not cut so there are close tolerances between the ends 32 of the blades 18 and the frame 35.

Referring also to FIG. 6, to allow the side seal 34 to make good contact with the blades 18 when they are closed, each blade 18 is provided with one flat side 30. Those flat sides 30 are made into flat configurations rather than the curved side configurations which are traditionally found on both sides of air damper blades 18. Also, the straight sides 22 of the square blade seals 12 that are located between the edges 14 and 16 of adjacent blades 18 when the blades 18 are closed provide an additional flat surface which the side seals 34 are able to engage and against which they seal.

Figure 4:
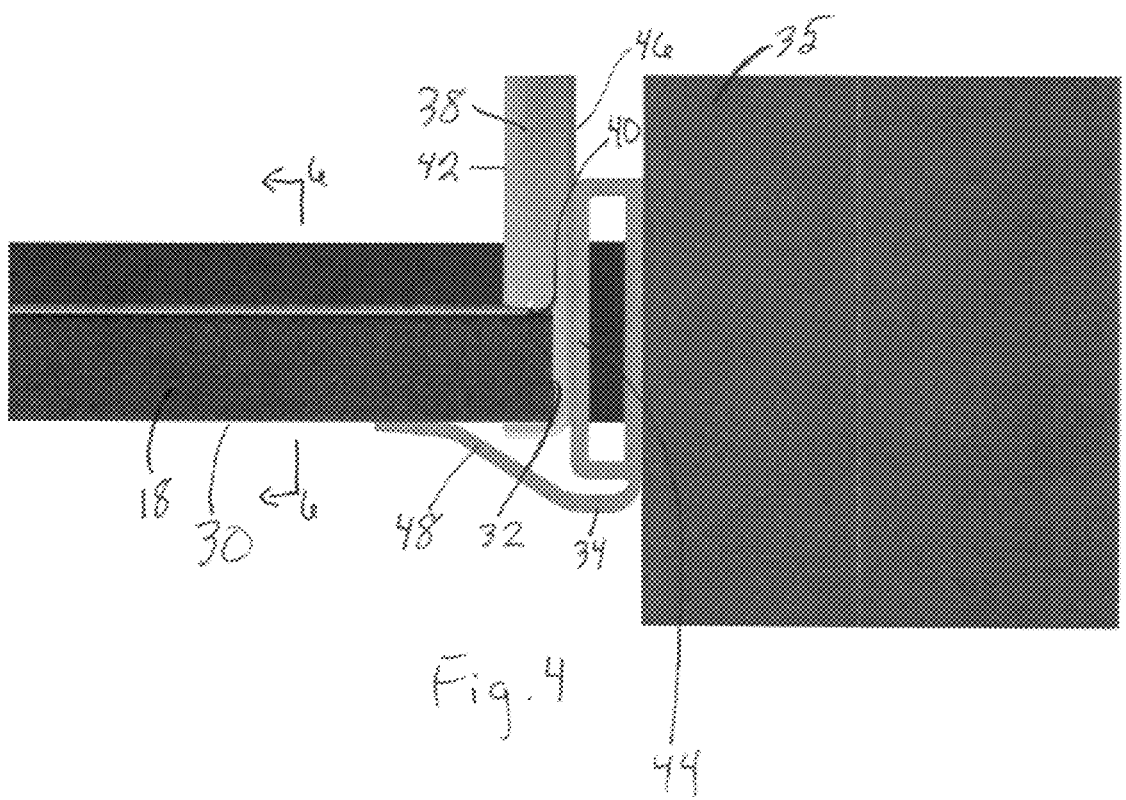
FIG. 4 is an enlarged view of the area with box 4 of FIG. 3
Figure 5:
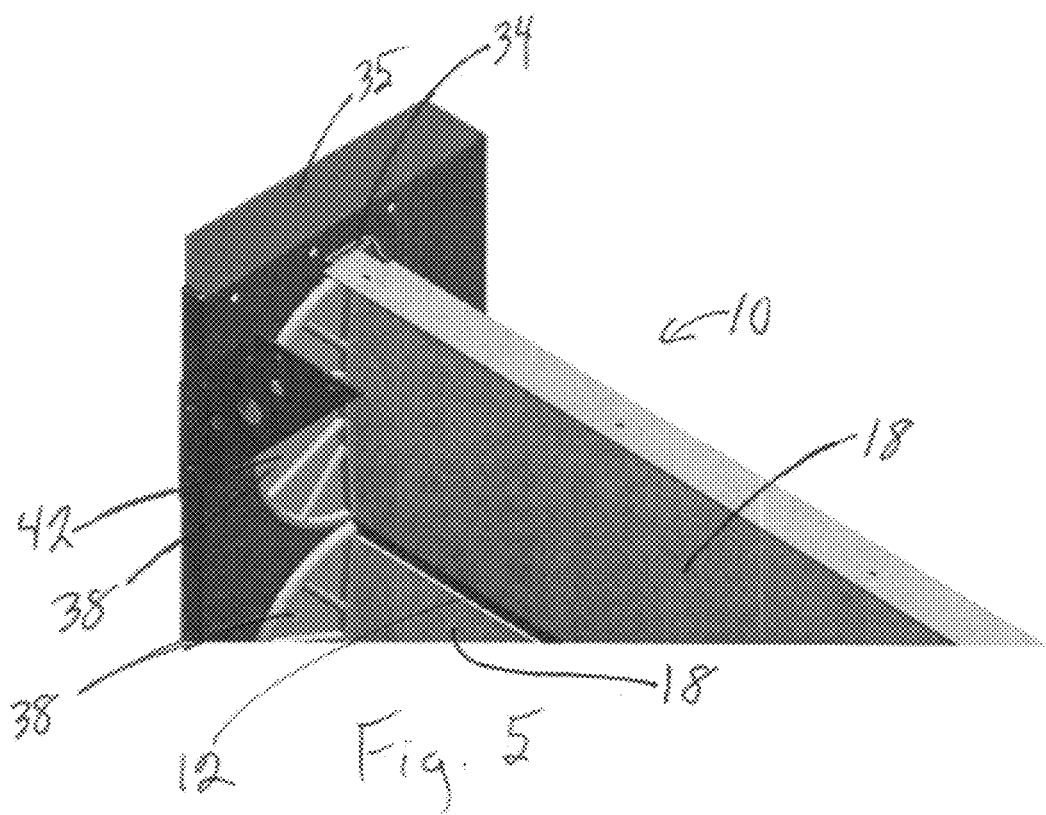
FIG. 5 is an enlarged view of the area within box 5 of FIG. 1.

As shown in FIGS. 4 and 5, the ends 32 of the blades 18 are received in and sealed within blade grooves 40 provided in interior or front sides 42 of the rotatable discs 38 provided on either end 32 of each blade 18. These rotatable discs 38 are secured to and sealed to the blade ends 32 and provide a straight vertical sealing surface for engagement by the L-shaped seals 34 on both ends 32 of the blades 18 even if the blade 32 is somewhat imperfectly cut.

One stationary leg 44 of each L-shaped side seal 34 engages and seals to the exterior or back side 46 of the discs 38. The other flexible leg 48 of each L-shaped side seal 34 laps over and extends beyond the blade ends 32 and makes a good seal with the flat sides 30 of the blades 18 when the blades 18 are closed. The flexible leg 48 is normally biased inward, as shown in outline in FIG. 8, but will flex outward, as shown in solid line in FIG. 8, when the blades 18 closes against it.

Figure 8:
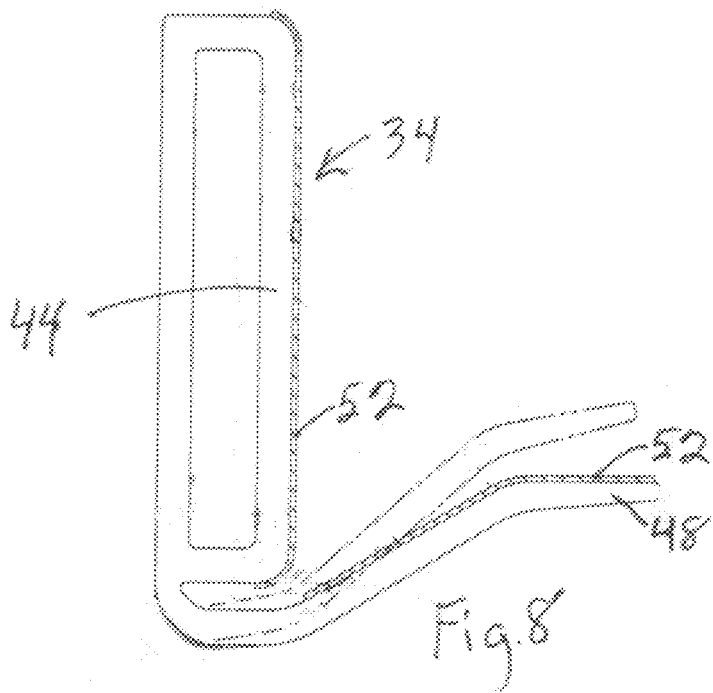
FIG. 8 is an enlarged view of the side seal of FIG. 4 shown removed from the damper.

Because of this arrangement of the discs 38, blades 18 and side seals 34; the side seals 34 make a good seal with the blades 18 even when the ends 32 of the blades 18 are not cut square, not cut to the same lengths, and not cut so there is a tight tolerance between the blade ends 32 and the frame 35 of the damper 10. The rotatable discs 38 are constructed of a low friction material. As the blades 18 rotate open, the discs 38 rotate in conjunction with the blades 18 and provide a low friction surface to compress and slide over the flexible leg 48 of the side seals. FIG. 8 illustrated how the flexible leg 48 is biased inward and flexes outward slightly to provide a tight seal when the blades 18 are closed against it.

Referring to FIGS. 7 and 8 low friction coating 52 is applied to the side seals 34 to further reduce friction and the torque required to open and close the damper blades 18.

Material for the low friction coating 52 is available from Lauren Manufacturing, 2228 Reiser Avenue S.E., New Philadelphia, Ohio 44663.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An air damper that provides a good seal with low torque requirements comprising:
    an air damper frame, said frame having two sides located opposite to each other on the frame, a plurality of parallel damper blades rotatable mounted within the frame with the blades surrounded by and supported by the frame, said blades rotate in unison and are designed to block air flow through the frame when the blades are closed by aligning the blades along a single vertical axis and designed to permit air flow through the frame when the blades are opened by the blades not being aligned along the single vertical axis, a front face of each blade being a flat front plane, a square configuration blade tip seal provided on one edge of each damper blade, said blade tip seals being square in cross sectional configuration to allow the blade tip seals to engage edges of adjacent blades before the blades are fully closed, the flat front planes of the blades and the blade tip seals create a continuously flat front plane when the blades are closed, and a side seal mechanism engaging the continuously flat front plane at each of the two sides of the frame, said side seal cooperates with and positively seals between the continuously flat front plane and the frame when the blades are closed even when the ends of the blades are not cut precisely square, the ends are not cut to the same lengths, or the ends are not cut to a tight tolerance between the blade ends and the frame, wherein the side seal mechanism further comprises: separate rotatable discs secured to each end of each blade so that the discs hold their associated blade ends within the frame and rotate with the blades, said rotatable discs engaging L-shaped side seals located on each side of the damper when the blades are open to force the L-shaped side seals away from the blades, a first stationary leg of each L-shaped side seal sealing between the discs and the frame, and an opposite second flexible lea of each L-shaped side seal sealing against the continuously flat front plane formed from the blades and the blade tip seals when the blades are closed.

2. An air damper according to claim 1 further comprising:
    each blade tip seal having a diameter on its diagonal that is greater in length than the length of the side of the blade tip seal to insure a good seal with the adjacent blade without the need for tight blade closing tolerances.

3. An air damper according to claim 2 wherein each blade tip seal further comprises:
    a base that secures to the blade edge, and
    a square configured portion attached to the base and that engages an opposing edge of an adjacent blade when the blades approach each other as they close.

4. An air damper according to claim 3 wherein the bases of the blade tip seals are constructed of plastic that is rigid, has low friction, and is dimensionally stable so that it maintains its length once it is cut to the desired length.

5. An air damper according to claim 4 wherein the bases of the blade tip seals are constructed from one of the following materials:
    polypropylene, nylon or ABS plastic.

6. An air damper according to claim 3 wherein the square configured portions of the blade tip seals are constructed from flexible resilient material capable of sealing against an opposing blade edge of an adjacent blade, and
    the square configured portions and the bases are bonded together to form the blade tip seals.

7. An air damper according to claim 3 further comprising:
    said square configured portions of the blade tip seals are constructed from sponge rubber, and the square configured portions and the bases are bonded together to form the blade tip seals.

8. An air damper according to claim 1 wherein each second leg of the L-shaped side seals is biased toward its associated first leg to insure a tight seal between the second legs and the blades and the blade tip seals even when the blades are not fully closed.

9. An air damper according to claim 1 further comprising:
    each rotatable disc provided with a blade groove on its front side to receive and seal therein its associated blade end.

10. An air damper according to claim 1 wherein the first legs of the L-shaped side seals engage back sides of associated rotatable discs to seal between the discs and sides of the frame.

11. An air damper according to claim 1 wherein the rotatable discs are constructed of a low friction material over which the compressed flexible second legs of the L-shaped side seals slide as the discs rotate.

12. An air damper according to claim 1 further comprising:
    a low friction coating applied to the side seals to further reduce friction and torque required to open and close the damper blades.

* * * * *